(12) United States Patent
Inada

(10) Patent No.: US 10,230,483 B2
(45) Date of Patent: Mar. 12, 2019

(54) OPTICAL TRANSMISSION SYSTEM, METHOD FOR ANALYZING THEREOF, TERMINAL STATION DEVICE, AND MANAGEMENT DEVICE

(71) Applicant: NEC Corporation, Tokyo (JP)

(72) Inventor: Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/558,860

(22) PCT Filed: Mar. 15, 2016

(86) PCT No.: PCT/JP2016/001457
§ 371 (c)(1),
(2) Date: Sep. 15, 2017

(87) PCT Pub. No.: WO2016/147655
PCT Pub. Date: Sep. 22, 2016

(65) Prior Publication Data
US 2018/0069648 A1 Mar. 8, 2018

(30) Foreign Application Priority Data
Mar. 18, 2015 (JP) .................. 2015-054563

(51) Int. Cl.
*H04J 14/02* (2006.01)
*H04B 10/073* (2013.01)
(Continued)

(52) U.S. Cl.
CPC ........ *H04J 14/0202* (2013.01); *H04B 10/073* (2013.01); *H04B 10/291* (2013.01);
(Continued)

(58) Field of Classification Search
CPC .. H04J 14/0201; H04J 14/021; H04J 14/0206; H04J 14/0213; H04J 14/0202;
(Continued)

(56) References Cited

U.S. PATENT DOCUMENTS 6,233,076 B1 * 5/2001 Iwata .................. H04J 14/0221
398/14
6,414,770 B2 * 7/2002 Iwata .................. H04J 14/0221
398/79
(Continued)

FOREIGN PATENT DOCUMENTS

| EP | 1503533 A2 | 2/2005 |
|---|---|---|
| EP | 2410677 A1 | 1/2012 |

(Continued)

OTHER PUBLICATIONS

International Search Report corresponding to PCT/JP2016/001457, 2 pages, dated Apr. 26, 2016.
(Continued)

*Primary Examiner* — Hibret A Woldekidan
(74) *Attorney, Agent, or Firm* — Wilmer Cutler Pickering Hale and Dorr LLP

(57) ABSTRACT

An optical transmission system includes: a terminal station device that transmits a wavelength multiplexed optical signal resulting from multiplexing an optical signal and dummy light; and an optical add-drop multiplexer that receives respective wavelength multiplexed optical signals transmitted from a plurality of the terminal station devices and performs add-drop processing on the wavelength multiplexed optical signals. The dummy light has a wavelength arrangement in which adjacent wavelengths are arranged with equal spacing, and the wavelength arrangement of the dummy light differs between the terminal station devices.

9 Claims, 16 Drawing Sheets

(51) Int. Cl.
*H04B 10/291* (2013.01)
*H04J 14/00* (2006.01)
*H04B 10/50* (2013.01)

(52) U.S. Cl.
CPC ............ *H04B 10/501* (2013.01); *H04J 14/00* (2013.01); *H04J 14/02* (2013.01)

(58) Field of Classification Search
CPC .... H04J 14/0205; H04J 14/0204; H04J 14/00; H04J 14/02; H04B 10/501; H04B 10/073; H04B 10/291
USPC ................. 398/104, 105, 83, 84, 85, 79
See application file for complete search history.

(56) References Cited

U.S. PATENT DOCUMENTS

| | | | | |
|---|---|---|---|---|
| 6,556,340 B1* | 4/2003 | Wysocki | ............... | H04B 10/291 359/334 |
| 6,813,447 B2* | 11/2004 | Ellis | ............... | H04L 7/0075 372/6 |
| 7,872,738 B2* | 1/2011 | Abbott | ............... | H04B 10/071 356/73.1 |
| 8,588,609 B2* | 11/2013 | Hiraizumi | ............... | H04B 10/07953 398/26 |
| 8,630,538 B2* | 1/2014 | Nashimoto | ............... | H04B 10/0799 398/160 |
| 8,902,495 B2* | 12/2014 | Clowes | ............... | H01S 3/06758 359/341.32 |
| 8,929,734 B2* | 1/2015 | Mizutani | ............... | G02B 6/2938 398/1 |
| 9,059,799 B2* | 6/2015 | Jiang | ............... | H04B 10/0797 |
| 2003/0138254 A1* | 7/2003 | Otsuka | ............... | H04J 14/0206 398/85 |
| 2003/0185567 A1* | 10/2003 | Kurumida | ............... | H04J 14/0204 398/79 |
| 2005/0008088 A1* | 1/2005 | Liu | ............... | H04L 27/2662 375/260 |
| 2005/0152693 A1* | 7/2005 | Grand | ............... | H04B 10/0775 398/27 |
| 2011/0026925 A1* | 2/2011 | Mu | ............... | H04L 12/40013 398/79 |
| 2011/0311216 A1* | 12/2011 | Inoue | ............... | H04B 10/0791 398/1 |
| 2012/0243879 A1* | 9/2012 | Nashimoto | ............... | H04B 10/0799 398/140 |
| 2012/0263476 A1* | 10/2012 | Sabet | ............... | H04B 10/0705 398/104 |
| 2013/0058647 A1* | 3/2013 | Boertjes | ............... | H04B 10/0775 398/38 |
| 2013/0259055 A1 | 10/2013 | Ji et al. | | |

FOREIGN PATENT DOCUMENTS

| | | |
|---|---|---|
| JP | 2010-226167 A | 10/2010 |
| JP | 2011-082751 A | 4/2011 |
| JP | 2012-182725 A | 9/2012 |

OTHER PUBLICATIONS

Written Opinion of the International Search Authority with English Translation corresponding to PCT/JP2016/001457, dated Apr. 26, 2016, 7 pages.

Extended European Search Report issued in European Patent Application No. 16764486.3, dated Nov. 2, 2018, 10 pages.

* cited by examiner

Fig.4

| MEASURED LIGHT | LIGHT SPECTRUM |
|---|---|
| (a): TRANSMISSION LIGHT OF STATION A | A-C, A-B → WAVELENGTH |
| (b): TRANSMISSION LIGHT OF STATION B | DL, B-C → WAVELENGTH |
| (c): TRANSMISSION LIGHT OF STATION A THAT PASSES THROUGH OADM BRANCHING DEVICE 2 | OADM PASSBAND; A-C; $\lambda_F$ → WAVELENGTH |
| (d): TRANSMISSION LIGHT OF STATION B THAT PASSES THROUGH OADM BRANCHING DEVICE 2 | OADM PASSBAND; B-C; $\lambda_F$ → WAVELENGTH |
| (e): RECEIVED LIGHT AT STATION C | A-C, B-C; $\lambda_F$ → WAVELENGTH |

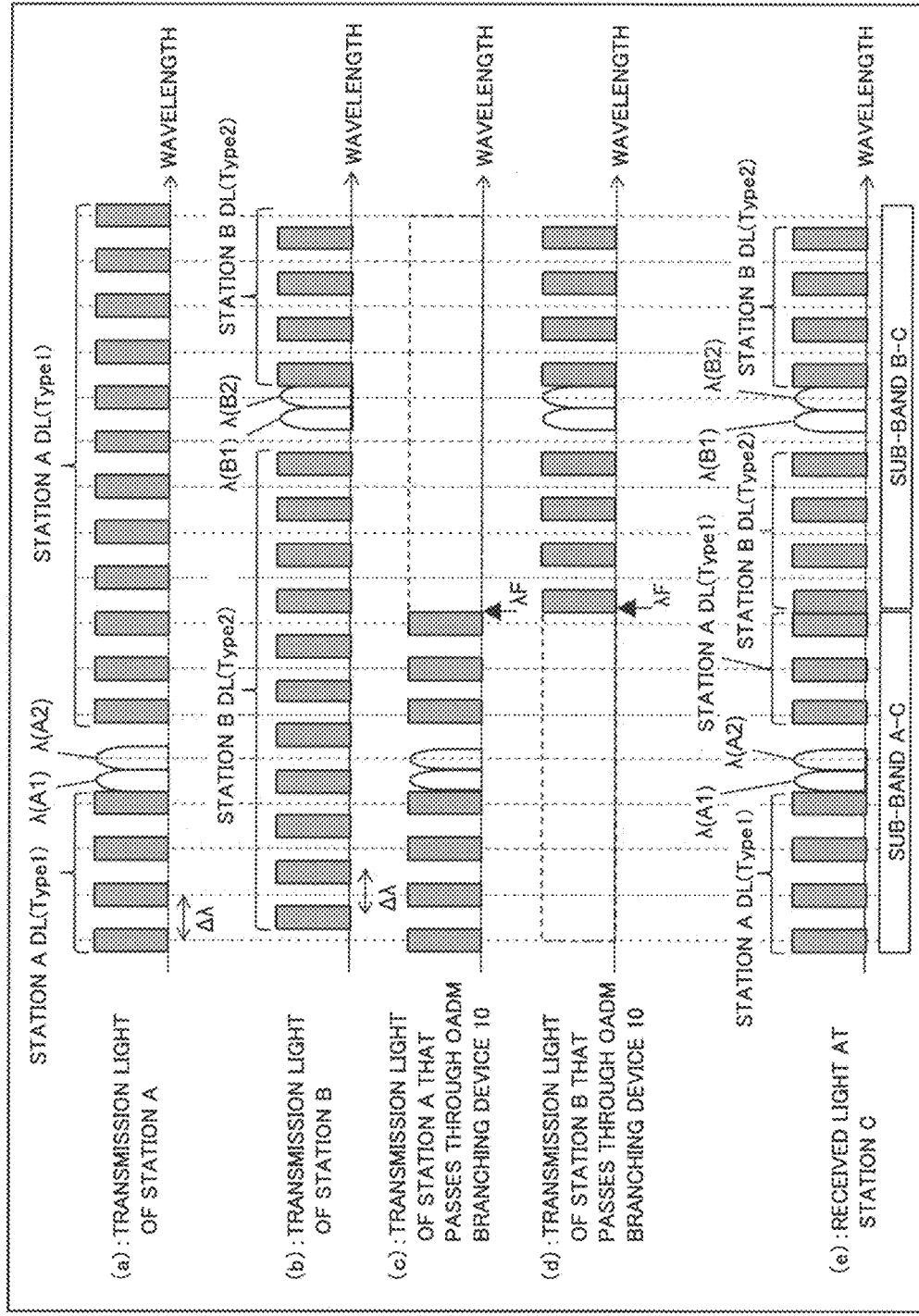

Fig.7

| MEASURED LIGHT | LIGHT SPECTRUM |
|---|---|
| (a): TRANSMISSION LIGHT OF STATION A | A-D \| A-B \| A-C → WAVELENGTH |
| (b): TRANSMISSION LIGHT OF STATION B | DL \| B-D \| DL → WAVELENGTH |
| (c): TRANSMISSION LIGHT OF STATION A THAT PASSES THROUGH OADM BRANCHING DEVICE 41 | A-D    A-C → WAVELENGTH<br>  ↑    ↑<br>  $\lambda$Fab  $\lambda$Fbc |
| (d): TRANSMISSION LIGHT OF STATION B THAT PASSES THROUGH OADM BRANCHING DEVICE 41 | B-D → WAVELENGTH<br>  ↑    ↑<br>  $\lambda$Fab  $\lambda$Fbc |
| (e): OUTPUT LIGHT FROM OADM BRANCHING DEVICE 41 | A-D \| B-D \| A-C → WAVELENGTH<br>        ↑  ↑<br>      $\lambda$Fab $\lambda$Fbc |

Fig.8

| MEASURED LIGHT | LIGHT SPECTRUM |
|---|---|
| (f): TRANSMISSION LIGHT OF STATION C | DL \| C-D → WAVELENGTH |
| (g): OUTPUT LIGHT FROM OADM BRANCHING DEVICE 41 THAT PASSES THROUGH OADM BRANCHING DEVICE 42 | A-D \| B-D → WAVELENGTH |
| (h): TRANSMISSION LIGHT OF STATION C THAT PASSES THROUGH OADM BRANCHING DEVICE 42 | C-D → WAVELENGTH, ↑ λFbc |
| (i): RECEIVED LIGHT AT STATION D | A-D \| B-D \| C-D → WAVELENGTH, ↑ λFab ↑ λFbc |

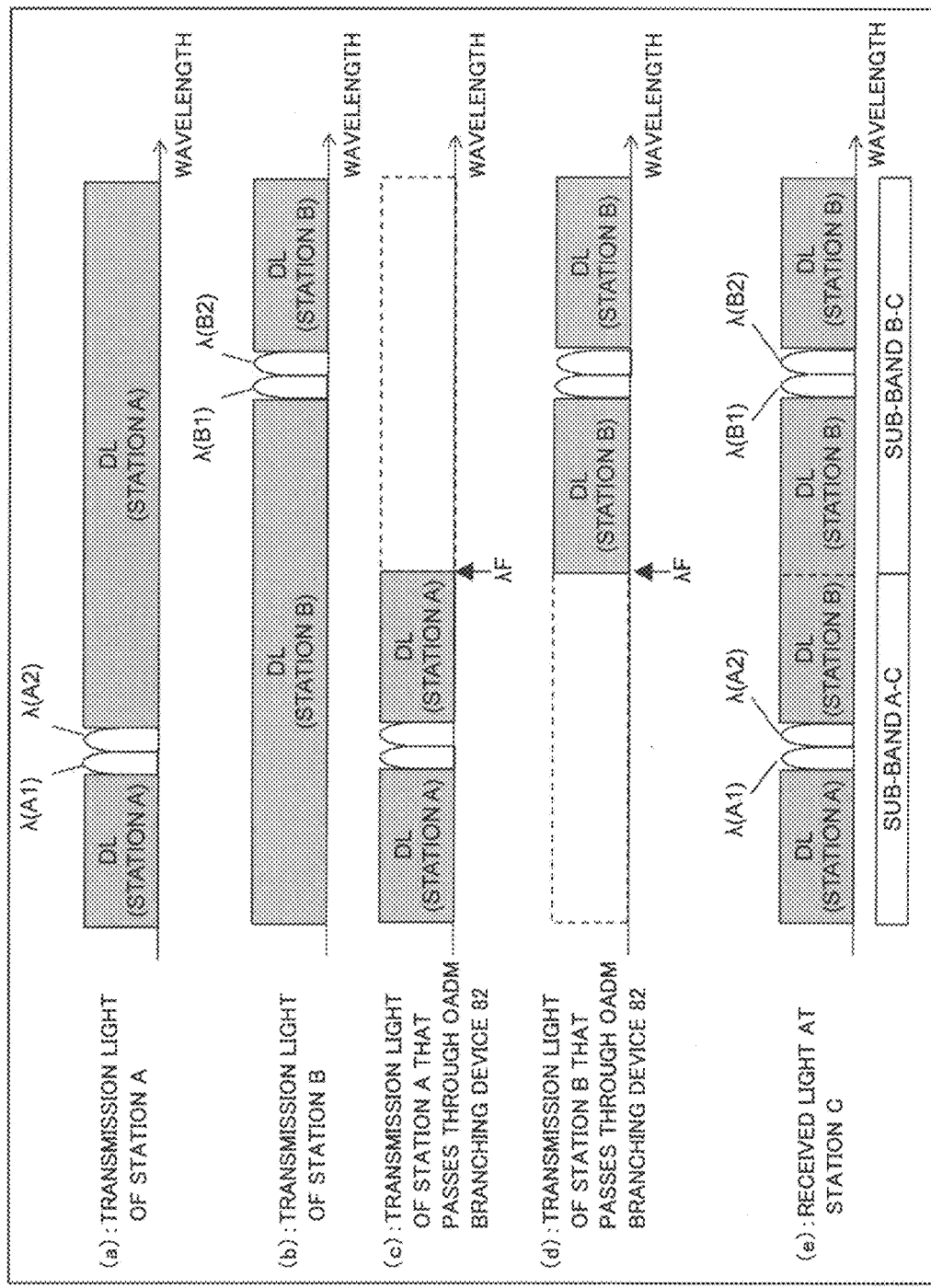

OPTICAL TRANSMISSION SYSTEM, METHOD FOR ANALYZING THEREOF, TERMINAL STATION DEVICE, AND MANAGEMENT DEVICE

CROSS-REFERENCE TO RELATED APPLICATIONS

This application is a national stage application of International Application No. PCT/JP2016/001457 entitled "OPTICAL TRANSMISSION SYSTEM, METHOD FOR ANALYZING SAME, TERMINAL STATION DEVICE, AND MANAGEMENT DEVICE," filed on Mar. 15, 2016, which claims the benefit of the priority of Japanese Patent Application No. 2015-054563 filed on Mar. 18, 2015, the disclosures of each of which are hereby incorporated by reference in their entirety.

TECHNICAL FIELD

The disclosed subject matter relates to an optical transmission system including an optical add-drop multiplexer.

BACKGROUND ART

With a growing demand for improvement of connectivity or convenience of operation in an optical transmission system that uses optical fibers in recent years, attention has been given to an optical transmission system that provides functionality of Optical Add-Drop Multiplexer (hereinafter called OADM) wavelength or wavelength band and variable wavelength functionality for optical signals on a same fiber transmission path. In particular, with improvement of resolution by introduction of a Wavelength Selective Switch (hereinafter called WSS) technology, further convenience or connectivity of an optical transmission system that employs an optical add-drop multiplexer (hereinafter referred to as OADM branching device) has become improved.

On the other hand, introduction of a wavelength multiplexing technology and OADM functionality has made a system configuration, such as wavelength band connection management, complex with increase in the number of stations, and it has become essential to provide a function of monitoring an operation state of an optical transmission system in order to deal with a failure or reconfiguration.

PTL 1 describes an optical signal level adjustment system including a signal interruption detection unit that detects a signal interruption on a wavelength-block basis in a terminal station device, and transmitting a control signal that adjusts intensity of dummy light of a terminal station device from which a signal interruption is detected.

CITATION LIST

Patent Literature

[PTL 1] Japanese Laid-open Patent Publication No. 2010-226167

SUMMARY OF INVENTION

Technical Problem

In an initial operation state of an optical transmission system including an OADM branching device, a proportion of the number of wavelengths (hereinafter called "waveband(s)") of dummy light in a Wavelength Division Multiplex (hereinafter called WDM) optical signal propagating along an optical transmission path is greater than a proportion of the number of wavelengths (waveband(s)) in a main signal.

FIG. 15 is a schematic diagram of an optical transmission system including an OADM branching device. As illustrated in FIG. 15, an optical transmission system 81 includes an OADM branching device 82, station A 83, station B 84, station C 85, and optical transmission paths 86, 87, and 88.

FIG. 16 is a schematic diagram illustrating states of light spectra in an initial operation of the optical transmission system 81 illustrated in FIG. 15. In the optical transmission system 81 in the initial operation, the station A 83 transmits transmission light in which an optical signal of two wavelengths, $\lambda(A1)$ and $\lambda(A2)$, which is communicated between the station A 83 and the station C 85, is arranged, and dummy light is arranged in the remaining bands ((a) of FIG. 16). Further, the station B 84 transmits transmission light in which an optical signal of two wavelengths, $\lambda(B1)$ and $\lambda(B2)$, which is communicated between the station B 84 and the station C 85, is arranged, and dummy light is arranged in the remaining bands ((b) of FIG. 16).

The OADM branching device 82 passes wavelengths of a band that is lower than a wavelength $\lambda F$ at a filter boundary, including $\lambda(A1)$ and $\lambda(A2)$, in the transmission light of the station A 83 ((c) of FIG. 16) and passes wavelengths in a band higher than $\lambda F$ in the transmission light of the station B 84 ((d) of FIG. 16). Further, the passed transmission light of the station A 83 and the passed transmission light of the station B 84 are multiplexed by the OADM branching device 82 and transmitted to the station C 85. As a result, in a state of the light spectrum of received light at the station C 85, the dummy light from the station A 83 and the dummy light from the station B 84 are arranged around the wavelength $\lambda F$ at the filter boundary. Accordingly, it is difficult to detect the filter boundary of the OADM branching device 82 in the received light at the station C 85.

As described above, when a proportion of a waveband of dummy light in a wavelength band of an optical transmission system is greater than a proportion of a waveband of a main optical signal, it is difficult to detect a filter boundary of an OADM branching device even by monitoring a WDM optical signal received at a terminal station. Consequently, a state of light transmission of the OADM branching device and a wavelength arrangement allocated to the optical transmission system cannot be detected.

An object of the disclosed subject matter is to provide a technique that enables a filter boundary of an OADM branching device to be detected at a terminal station even when a proportion of a dummy light is greater than a proportion of a main optical signal waveband in a wavelength band of an optical transmission system.

Solution to Problem

An optical transmission system according to one aspect of the disclosed subject matter includes: a terminal station device that transmits a wavelength multiplexed optical signal resulting from multiplexing an optical signal and dummy light; and an optical add-drop multiplexer that receives respective wavelength multiplexed optical signals transmitted from a plurality of the terminal station devices and performs add-drop processing on the wavelength multiplexed optical signals. The dummy light has a wavelength arrangement in which adjacent wavelengths are arranged with equal spacing, and the wavelength arrangement of the dummy light differs between the terminal station devices.

A terminal station device of an optical transmission system according to one aspect of the disclosed subject matter includes an optical add-drop multiplexer that receives a wavelength multiplexed optical signal resulting from multiplexing an optical signal and dummy light from each of a plurality of terminal station devices and performs add-drop processing on the wavelength multiplexed optical signal. The dummy light has a wavelength arrangement in which adjacent wavelength spacing is equally spaced and the wavelength arrangement of the dummy light differs between the terminal station devices.

A receiving terminal station device of an optical transmission system according to includes an optical add-drop multiplexer that receives a wavelength multiplexed optical signal from each of a plurality of terminal station devices.

The receiving terminal station device includes:

a light spectrum monitor means that measures a light spectrum of output light transmitted from the optical add-drop multiplexer; and a monitoring means that detects a filter boundary of the optical add-drop multiplexer in a measured light spectrum, based on a difference in a wavelength arrangement of dummy light between the terminal station devices, the difference being reflected in the light spectrum.

The optical add-drop multiplexer receives a wavelength multiplexed optical signal resulting from multiplexing the dummy light and an optical signal, the dummy light having a wavelength arrangement that differs between the terminal station devices.

An analyzing method for an optical transmission system according to one aspect of the disclosed subject matter includes an optical add-drop multiplexer coupled to terminal station devices.

The analyzing method includes:

performing, by the optical add-drop multiplexer, add/drop processing on a wavelength multiplexed optical signal resulting from multiplexing dummy light and an optical signal, and transmitting a resulting signal, the dummy light having a wavelength arrangement that differs between the terminal station devices; and measuring a light spectrum of output light transmitted from the optical add-drop multiplexer and detecting a filter boundary of the optical add-drop multiplexer in the light spectrum, based on a difference in a wavelength arrangement of the dummy light between the terminal station devices, the difference being reflected in the light spectrum.

A management device of the optical transmission system according to one aspect of the disclosed subject matter, the management device is coupled to the terminal station devices and transmits wavelength arrangement information in which the wavelength arrangement of the dummy light differs between the terminal station devices, to the terminal station devices.

Advantageous Effects of Invention

The disclosed subject matter enables a filter boundary of an optical add-drop multiplexer to be detected at a terminal station even when a proportion of a dummy light waveband in a wavelength band of an optical transmission system is greater than a proportion of a waveband of a main optical signal.

BRIEF DESCRIPTION OF DRAWINGS

FIG. 4 is a conceptual diagram illustrating states of light spectra in the optical transmission system in the first example embodiment;

FIG. 5 is a conceptual diagram illustrating states of light spectra in an optical transmission system that uses dummy light having wavelength arrangements that differ from one terminal station to another;

FIG. 7 is a conceptual diagram illustrating states of light spectra in the optical transmission system in the second example embodiment;

FIG. 8 is a conceptual diagram illustrating states of light spectra in the optical transmission system in the second example embodiment;

FIG. 16 is schematic diagram illustrating states of light spectra in an optical transmission system in an initial operation.

DESCRIPTION OF EMBODIMENTS

First Example Embodiment

Figure 1:
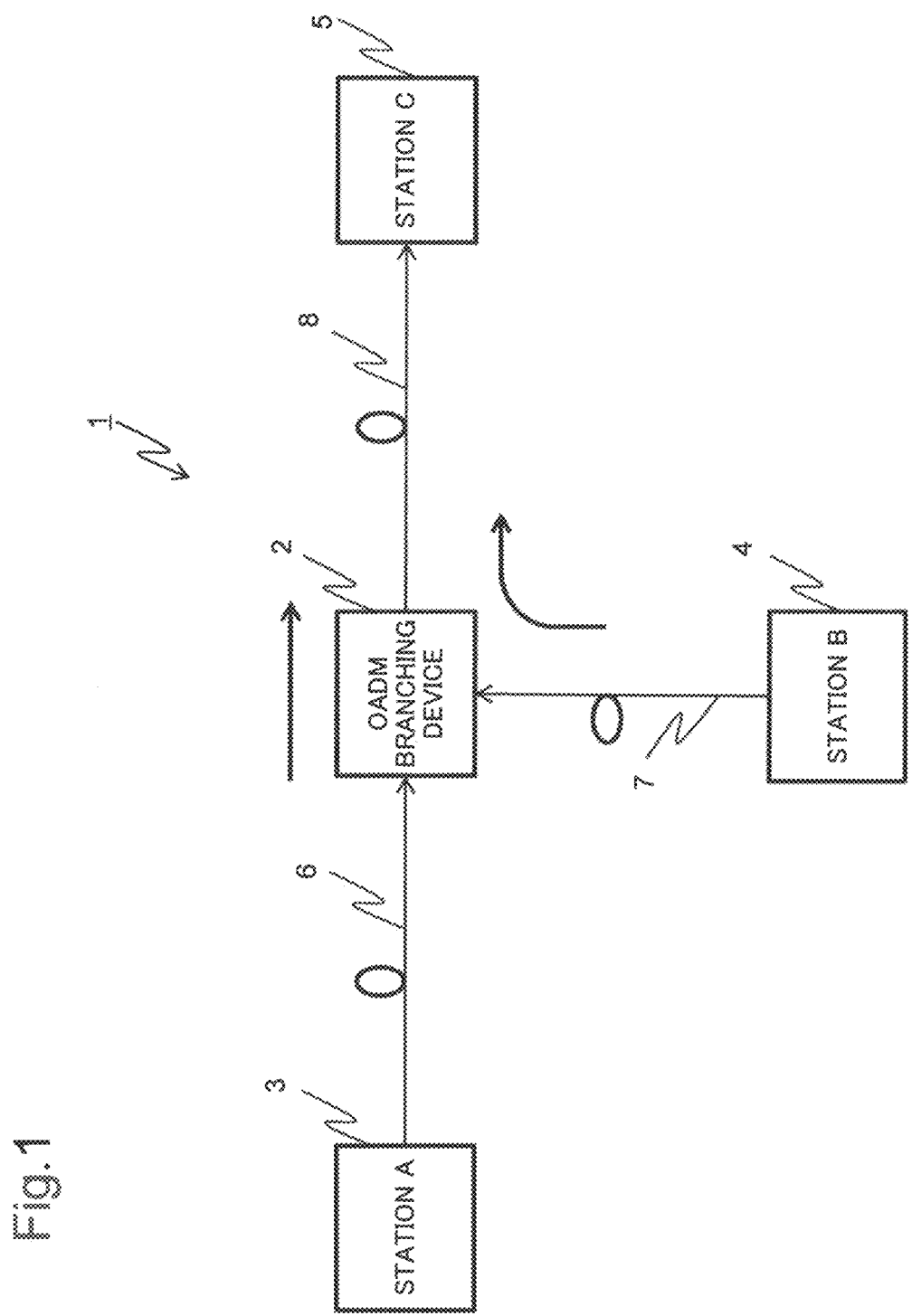
FIG. 1 is a block diagram illustrating a configuration of an optical transmission system in a first example embodiment.

An optical transmission system in a first example embodiment of the disclosed subject matter will be described first using drawings. FIG. 1 is a block diagram illustrating a configuration of an optical transmission system in the first example embodiment.

As illustrated in FIG. 1, an optical transmission system 1 includes an OADM branching device 2, a terminal station device 3 of station A, a terminal station device 4 of station B, a terminal station device 5 of station C, and optical transmission paths 6, 7 and 8. The terminal station devices 3, 4 and 5 are coupled to the OADM branching device 2 through the optical transmission paths 6, 7 and 8, respectively. Each of the terminal station devices 3, 4 and 5 includes an optical transmission device 10 and an optical receiving device 20.

Figure 2:
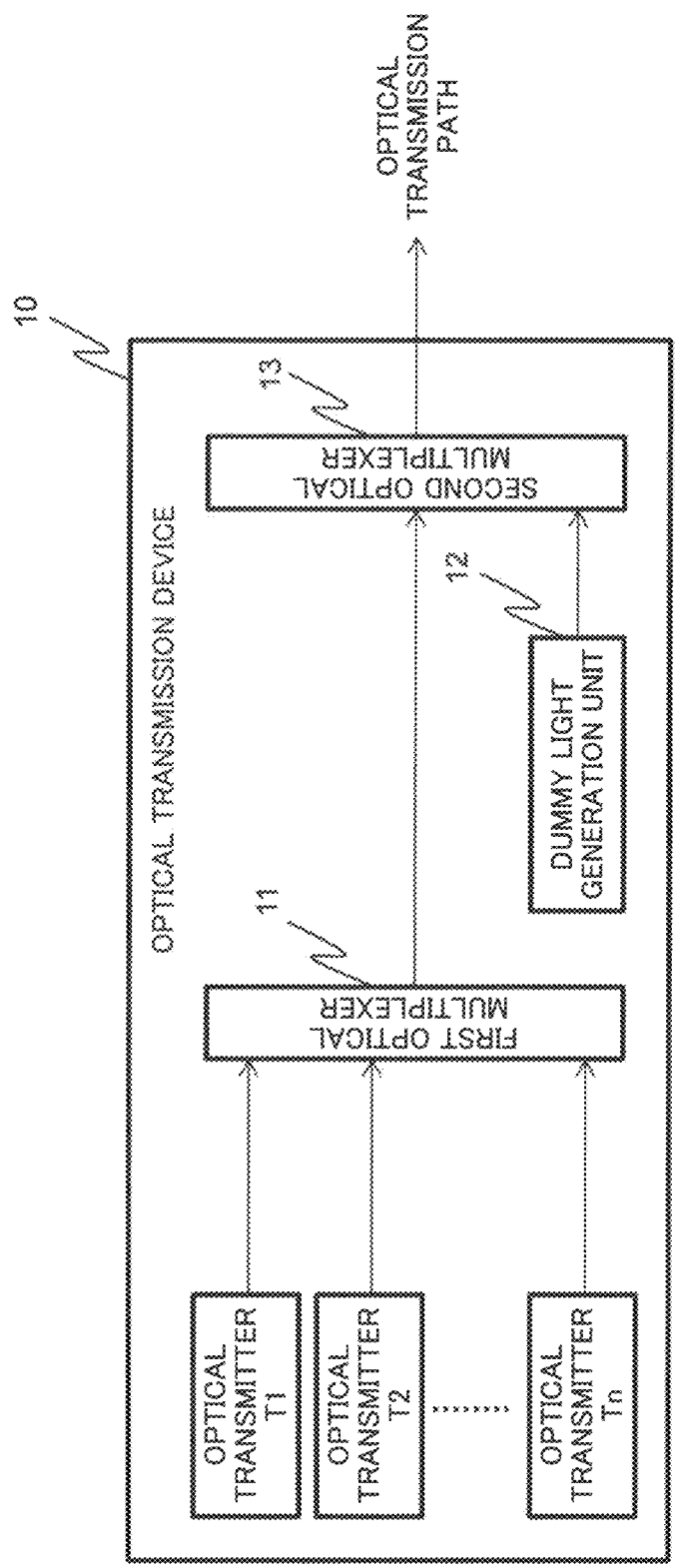
FIG. 2 is a block diagram illustrating a configuration of an optical transmission device of a terminal station device in the first example embodiment.

The optical transmission device 10 will be described. FIG. 2 is a block diagram illustrating a configuration of the optical transmission device 10. As illustrated in FIG. 2, the optical transmission device 10 includes optical transmitters T1 to Tn (n is an integer greater than or equal to 1), a first optical multiplexer 11, a dummy light emission unit 12, and a second optical multiplexer 13. Each of the optical transmitters T1 to Tn transmits an optical signal having a predetermined wavelength. The first optical multiplexer 11 multiplexes optical signals from the optical transmitters T1 to Tn to generate a WDM optical signal.

The dummy light emission unit 12 emits dummy light for stabilizing gain characteristics of an optical amplifier/repeater (not illustrated) in the optical transmission system 1. Amplified Spontaneous Emission (hereinafter called ASE) dummy light based on spontaneous-emission optical noise caused by an Erbium Doped optical Fiber Amplifier (hereinafter called EDFA) is emitted, and the ASE dummy light is shaped by a wavelength filter to emit dummy light. For example, the dummy light emission unit 12 emits dummy light having a comb-shaped equally-spaced (with wavelength spacing $\Delta\lambda$) light spectrum. A wavelength of the dummy light emitted is shifted so that wavelength arrangements of the dummy light differ from one terminal station to another.

The method for emitting dummy light with wavelength arrangements that are different from one terminal station to another is not limited to the wavelength shifting. For example, the dummy light emission unit 12 may emit dummy light in such a way that each terminal has a different center wavelength position of a rectangular light spectrum that constitutes dummy light differs from one terminal station to another, or a different rectangular light spectrum width of dummy light differs from one terminal station to another, or a different wavelength spacing of dummy light differs from one terminal station to another (for example, $\Delta\lambda 1$ and $\Delta\lambda 2$).

Further, dummy light can be emitted by using dummy light based on Continuous Wave (hereinafter called CW) light caused by Laser Diode (hereinafter called LD), other than being based on ASE light caused by EDFA.

Note that while the configuration in FIG. 1 is an example of application to an optical transmission system in which three terminal stations are coupled to an OADM branching device, application to an optical transmission system including four or more terminal stations is also possible by providing a plurality of OADM branching devices. In an optical transmission system including four or more terminal stations, a wavelength arrangement of dummy light does not need to be varied at each of the four or more terminal stations as long as the wavelength arrangements of adjacent sub-bands are varied from one another when a terminal station receives and monitors a WDM optical signal.

For example, assume that received light at a terminal station is made up of the following wavelength bands: a sub-band A-D, a sub-band B-D, and a sub-band C-D. In this case, when the arrangements of wavelengths of dummy light differ between the sub-band A-D and the sub-band B-D, and between the sub-band B-D and the sub-band C-D, a filter boundary of the OADM can be detected even if the arrangements of wavelengths of dummy light of the sub-band A-D and the sub-band C-D are identical to each other. In this way, dummy light of each terminal station is generated so that in a WDM optical signal received at the terminal stations, wavelength arrangements of dummy light differ between terminal stations that transmit optical signals of adjacent sub-bands.

Further, the OADM branching device 2 includes an OADM functionality of adding or dropping an optical signal on a wavelength-by-wavelength basis and adds or drops, on a waveband-by-waveband basis, a WDM optical signal transmitted from each of the terminal station device 3 of station A and the terminal station device 4 of station B. It is assumed here that a filter boundary at which adding or dropping is performed on a waveband-by-waveband basis is $\lambda F$ unless otherwise specified.

Figure 3:
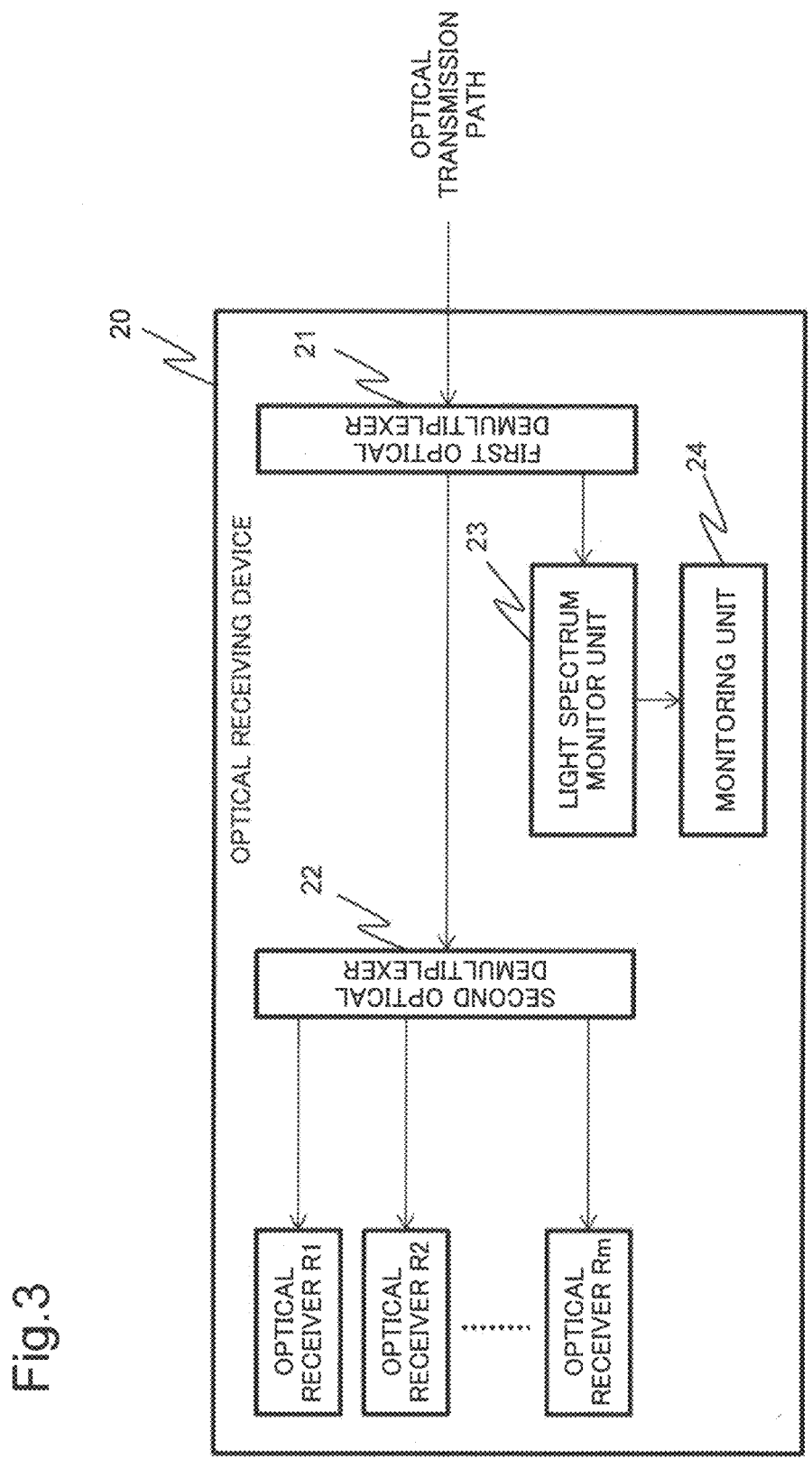
FIG. 3 is a block diagram illustrating a configuration of an optical receiving device of a terminal station device in the first example embodiment.

The optical receiving device 20 will be described next. FIG. 3 is a block diagram illustrating a configuration of the optical receiving device 20. As illustrated in FIG. 3, the optical receiving device 20 includes a first optical demultiplexer 21, a second optical demultiplexer 22, a light spectrum monitor unit 23, a monitoring unit 24, and optical receivers R1 to Rm (m is an integer greater than or equal to 1).

The first optical demultiplexer 21 demultiplexes a WDM optical signal transmitted from the OADM branching device 2. One of the demultiplexed WDM optical signals is transmitted to the second optical demultiplexer 22 while the other is transmitted to the light spectrum monitor unit 23.

The second optical demultiplexer 22 demultiplexes the input WDM optical signal into respective predetermined wavelengths and the optical receivers R1 to Rm receive optical signals of the demultiplexed wavelengths. The light spectrum monitor unit 23 measures output light spectra of the WDM optical signals demultiplexed at the first optical demultiplexer 21 and the monitoring unit 24 analyses a result of the measurement by the light spectrum monitor unit 23.

The monitoring unit 24 is capable of detecting a filter boundary of the OADM branching device at a terminal station even if the proportion of a waveband of dummy light in a wavelength band of the optical transmission system is greater than the proportion of a waveband of a main optical signal. This is because wavelength arrangements of dummy light differ from one terminal station to another and accordingly, the filter boundary of the OADM branching device and other parts thereof are different in the shape of the light spectrum of the dummy light.

Examples of wavelength arrangements of transmission light of station A and station B and a wavelength arrangement of received light at station C in the optical transmission system including the OADM branching device of the first example embodiment will be described next by using drawings. FIG. 4 is a conceptual diagram illustrating states of light spectra in the optical transmission system 1. The terminal station device 3 of station A transmits an optical signal in a waveband "A-B" for communication between station A and station B and an optical signal in a waveband "A-C" for communication between station A and station C ((a) of FIG. 4).

The terminal station device 4 of station B transmits an optical signal in a waveband "B-C" for communication between station B and station C and dummy light (hereinafter referred to as DL as appropriate) for stabilizing an optical amplifier/repeater included in the optical transmission path ((b) of FIG. 4).

The OADM branching device 2 uses a filter of OADM functionality to pass only the optical signal in the waveband "A-C" assigned to communication between station A and station C out of optical signals from the terminal station device 3 of station A ((c) of FIG. 4). Further, the OADM branching device 2 passes only the optical signal in the waveband "B-C" assigned to communication between station B and station C out of optical signals from station B ((d) of FIG. 4). The OADM branching device 2 multiplexes and transmits the respective optical signals that have passed through the filter. As a result, the terminal station device 5 of station C receives the optical signals in the waveband "A-C" and waveband "B-C" ((e) of FIG. 4).

An operation of the optical transmission system in the first example embodiment will be described next by using drawings. FIG. 5 is a conceptual diagram illustrating states of light spectra in the optical transmission system that uses dummy light having wavelength arrangements that differ from one terminal station to another. An example will be described in which, in the optical transmission system in the first example embodiment, dummy light from terminal stations A and B has comb-shaped wavelength arrangements with equal wavelength spacings ($\Delta\lambda$), and the wavelength arrangements of the dummy light of the terminal stations A and B are shifted from one another.

As illustrated in FIG. 5, the terminal station device 3 of station A in the optical transmission system 1 multiplexes and transmits optical signals of $\lambda$(A1) and $\lambda$(A2), which are in a waveband "A-C" for communication between station A and station C, and station A DL (Type 1), which is dummy light ((a) of FIG. 5). Station A DL (Type 1) has a comb-shaped wavelength arrangement of dummy light with equal wavelength spacing ($\Delta\lambda$).

The terminal station device 4 of station B multiplexes and transmits optical signals of $\lambda$(B1) and $\lambda$(B2), which are in a waveband "B-C" for communication between station B and station C, and station B DL (Type 2), which is dummy light. Station B DL (Type 2) has a comb-shaped wavelength arrangement of dummy light with equal wavelength spacing ($\Delta\lambda$). Note that the wavelength arrangement of station B DL (Type 2) and the wavelength arrangement of station A DL (Type 1) are wavelength-shifted from one another ((b) of FIG. 5).

The OADM branching device 2 uses a filter of OADM functionality to pass only the optical signal in the waveband "A-C" assigned to communication between station A and station C out of optical signals from the terminal station device 3 of station A ((c) of FIG. 5). Further, the OADM branching device 2 passes only the optical signal in the waveband "B-C" assigned to communication between station B and station C out of optical signals from station B ((d) of FIG. 5). The OADM branching device 2 multiplexes and transmits the respective optical signals that have passed through the filter. As a result, the terminal station device 5 of station C receives the optical signals in the waveband "A-C" and the waveband "B-C" ((e) of FIG. 5).

The terminal station device 5 of station C measures a light spectrum of the received light by using the optical spectrum monitor unit 23 and the monitoring unit 24 analytically detects the presence of a region in which dummy light has a wavelength arrangement whose spacing is different from the equal wavelength spacing ($\Delta\lambda$), thereby making is possible to detect the wavelength position of such region. This allows the terminal station device 5 of station C to detect the wavelength at a filter boundary of the OADM branching device 2.

As described above, the first example embodiment enables a filter boundary of an OADM branching device to be identified at a terminal station even when the proportion of a waveband of dummy light in a wavelength band of an optical transmission system is greater than the proportion of a waveband of a main optical signal.

Second Example Embodiment

While an example has been described in which three terminal station devices are coupled to one OADM branching device in the optical transmission system of the first example embodiment, an example will be described in a second example embodiment in which OADM branching devices are provided, and one optical transmission system includes four terminal station devices.

Figure 6:
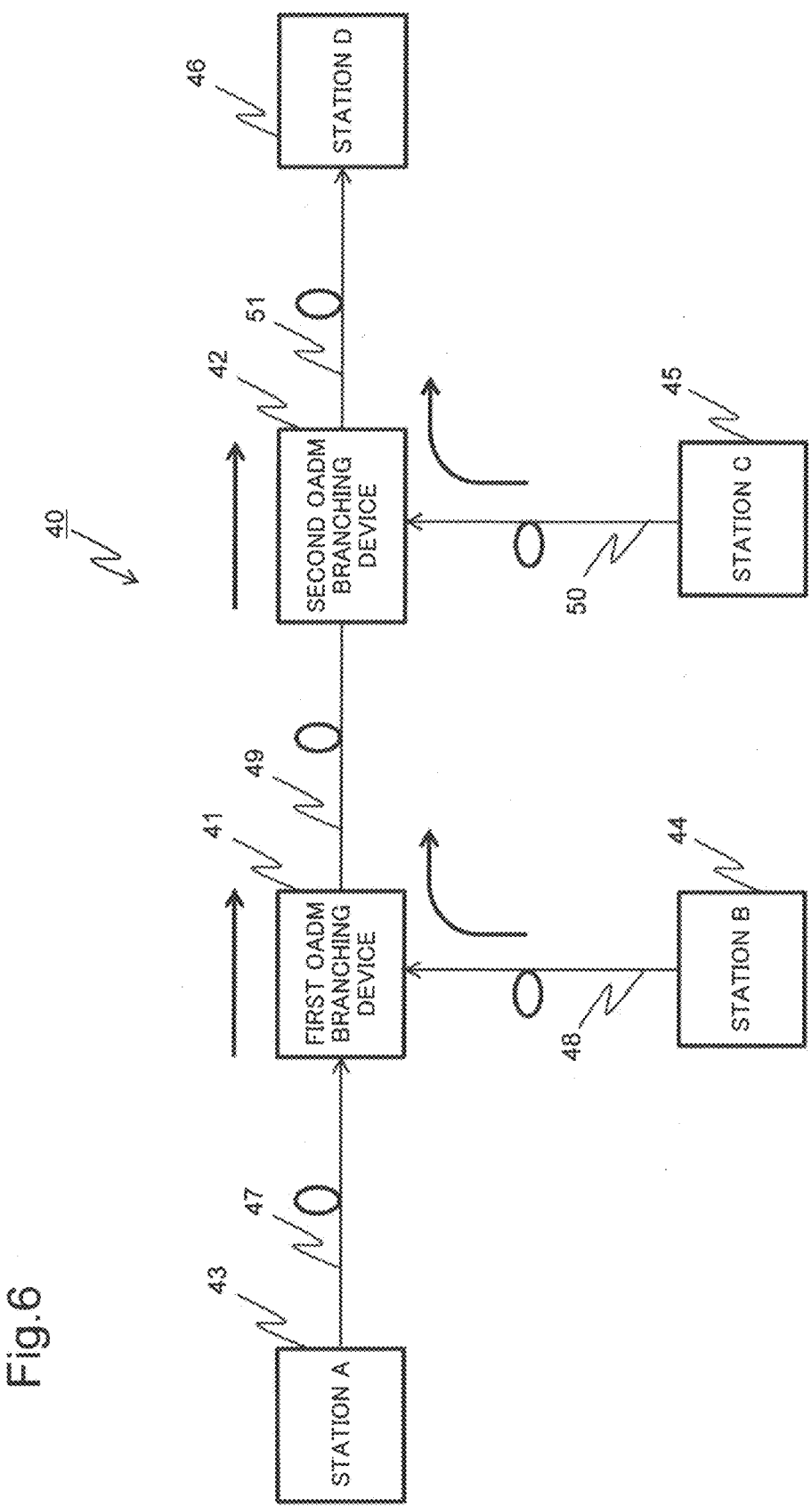
FIG. 6 is a block diagram illustrating a configuration of an optical transmission system in a second example embodiment.

FIG. 6 is a block diagram illustrating a configuration of an optical transmission system including two OADM branching devices. As illustrated in FIG. 6, an optical transmission system 40 includes a first OADM branching device 41, a second OADM branching device 42, a terminal station device 43 of station A, a terminal station device 44 of station B, a terminal station device 45 of station C, a terminal station device 46 of station D, and optical transmission paths 47, 48, 49, 50 and 51. The terminal station devices 43 and 44 are coupled to the first OADM branching device 41 through the optical transmission paths 47 and 48, respectively, and the terminal station devices 45 and 46 are coupled to the second OADM branching device 42 through the optical transmission paths 50 and 51, respectively. Further, the first OADM branching device 41 and the second OADM branching device 42 are coupled to each other through the optical transmission path 49. Each of the terminal station devices 43, 44, 45 and 46 includes an optical transmission device 10 and an optical receiving device 20.

When there are four stations as in the optical transmission system of the second example embodiment, WDM wavebands of transmission signals from three terminal stations need to be distinguished from one another. Examples of wavelength arrangements of transmission light at the terminal station device 43 of station A, the terminal station device 44 of station B and the terminal station device 45 of station C and a wavelength arrangement of received light at station D in the optical transmission system 40 of the second example embodiment will be described.

FIGS. 7 and 8 are conceptual diagrams illustrating states of light spectra in the optical transmission system 40 of the second example embodiment.

The terminal station device 43 of station A multiplexes and transmits an optical signal, which is in a waveband "A-D" for communication between station A and station D, an optical signal in a waveband "A-B" for communication between station A and station B, and an optical signal in a waveband "A-C" for communication between station A and station C ((a) of FIG. 7).

The terminal station device 44 of station B multiplexes and transmits an optical signal, where is in a waveband "B-D" for communication between station B and station D, and two streams of dummy light (DL) ((b) of FIG. 7).

The first OADM branching device 41 uses a filter of OADM functionality to pass only the optical signal in the waveband "A-D" assigned to communication between station A and station D and the optical signal in the waveband "A-C" assigned to communication between station A and station C out of optical signals from the terminal station device 43 of station A ((c) of FIG. 7). Further, the first OADM branching device 41 passes only the optical signal in the waveband "B-D" assigned to communication between station B and station D out of optical signals from the terminal station device 44 of station B ((d) of FIG. 7). The first OADM branching device 41 multiplexes the respective optical signals that have passed through the filter and transmits the multiplexed optical signal including the waveband "A-D", the waveband "A-C" and the waveband "B-D" ((e) of FIG. 7).

The terminal station device 45 of station C multiplexes and transmits the optical signal, which is in a waveband "C-D" for communication between station C and station D, and dummy light (DL) ((f) of FIG. 8).

The second OADM branching device 42 uses a filter of OADM functionality to pass only the optical signal in the waveband "A-D" assigned to communication between station A and station D and the optical signal in the waveband "B-D" assigned to communication between station B and station D out of optical signals from the first OADM branching device 41 ((g) of FIG. 8).

Further, the second OADM branching device 42 uses the filter of OADM functionality to pass only the optical signal in the waveband "C-D" assigned to communication between station C and station D out of optical signals from the terminal station device 45 of station C ((h) of FIG. 8). As a result, the terminal station device 45 of station D receives the optical signal including the waveband "A-D", the waveband "B-D" and the waveband "C-D" ((i) of FIG. 8).

Figure 9:
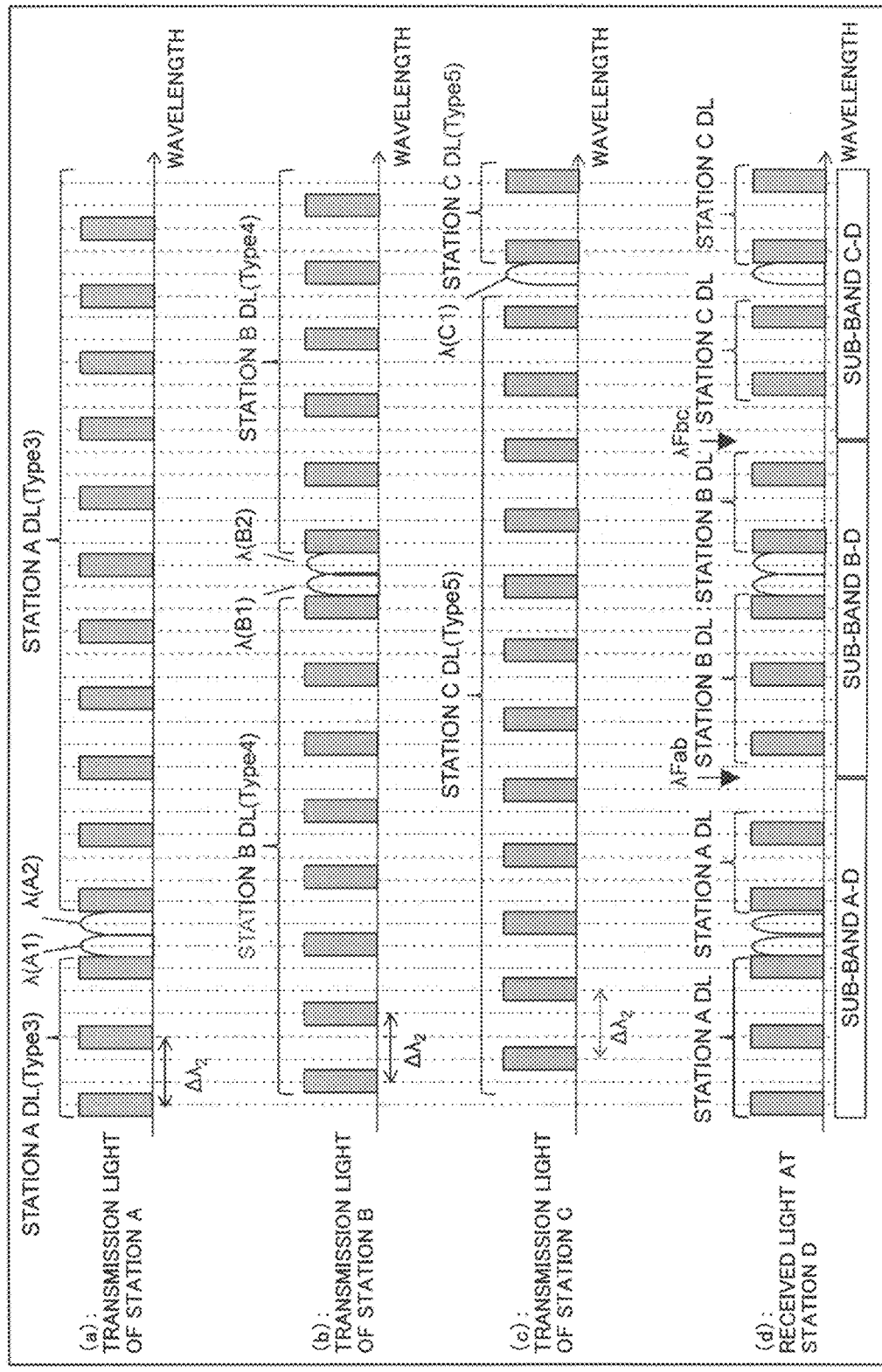
FIG. 9 is a conceptual diagram illustrating states of light spectra in an optical transmission system that uses dummy light having wavelength arrangements that differ from one terminal station to another.

An operation of the optical transmission system in the second example embodiment will be described next by using drawings. FIG. 9 is a conceptual diagram illustrating states of light spectra in the optical transmission system that uses dummy light having wavelength arrangements that differ from one terminal station to another. The optical transmission system in the second example embodiment will be described by using an example in which dummy light from each terminal station has a comb-shaped wavelength arrangement with equal wavelength spacing ($\Delta\lambda_2$), and the wavelength arrangements of the dummy light of terminal stations A, B and C are shifted from one another.

As illustrated in FIG. 9, the terminal station device 43 of station A in the optical transmission system 1 multiplexes and transmits optical signals of $\lambda(A1)$ and $\lambda(A2)$, which are in a waveband "A-D" for communication between station A and station D, and station A DL (Type 3), which is dummy light ((a) of FIG. 9). Station A DL (Type 3) has a comb-shaped wavelength arrangement of dummy light with equal wavelength spacing ($\Delta\lambda_2$).

The terminal station device 44 of station B multiplexes and transmits optical signals of $\lambda(B1)$ and $\lambda(B2)$, which are in a waveband "B-D" for communication between station B and station C, and station B DL (Type 4), which is dummy light. Station B DL (Type 4) has a comb-shaped wavelength arrangement of dummy light with equal wavelength spacing ($\Delta\lambda_2$) ((b) of FIG. 9).

The terminal station device 45 of station C multiplexes and transmits an optical signal of $\lambda(C1)$, which is in a waveband "C-D" for communication between station C and station D, and station C DL (Type 5), which is dummy light. Station C DL (Type 5) has a comb-shaped wavelength arrangement of dummy light with equal wavelength spacing ($\Delta\lambda_2$).

Wavelength arrangements of dummy light of station A DL (Type 3), station B DL (Type 4) and station C DL (Type 5) do not overlap one another.

Transmission lights from station A, station B and station C are transmitted to station D through the first OADM branching device 41 and the second OADM branching device 42. The terminal station device 46 of station D receives the optical signal including the waveband "A-D", the waveband "B-D" and the waveband "C-D" ((d) of FIG. 9).

The terminal station device 46 of station D uses the light spectrum monitor unit 23 to measure a light spectrum of the received light. The monitoring unit 24 analytically detects the presence of two regions in which dummy light has wavelength arrangements whose spacing is different from equal wavelength spacing ($\Delta\lambda2$), thereby making it possible to detect the wavelength positions of such regions. This allows the terminal station device 46 of station D to detect a wavelength $\lambda F_{ab}$ at a filter boundary of the first OADM branching device 41 and a wavelength $\lambda F_{bc}$ at a filter boundary of the second OADM branching device 42.

As described above, the second example embodiment enables a filter boundary of an OADM branching device to be identified at a terminal station even when the proportion of a waveband of dummy light in a wavelength band of an optical transmission system is greater than the proportion of a waveband of a main optical signal.

Third Example Embodiment

A third example embodiment differs from the first example embodiment in that dummy light of transmission light from the terminal station device 4 of station B in the optical transmission system of the first example embodiment is not comb-shaped (discrete-rectangle-shaped) but is flat-shaped (continuous-shaped) in the third example embodiment. This example can be seen as a case where a light spectrum widths of dummy light in the wavelength arrangements differs between station A and station B.

Figure 10:
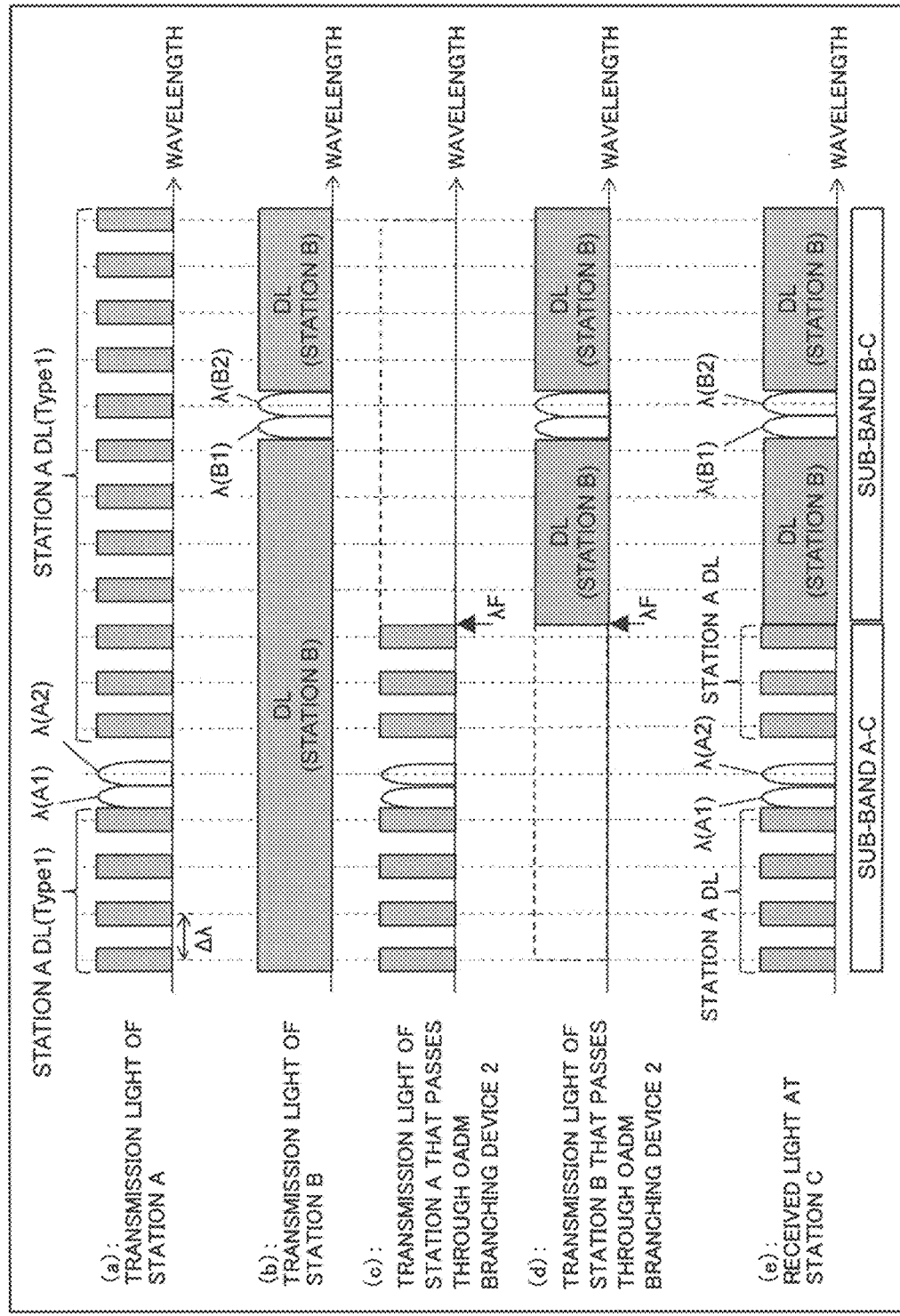
FIG. 10 is a conceptual diagram illustrating states of light spectra in an optical transmission system that uses dummy light having wavelength arrangements that differ from one terminal station to another.

As illustrated in FIG. 10, a terminal station device 3 of station A of the optical transmission system 1 multiplexes and transmits optical signals of $\lambda(A1)$ and $\lambda(A2)$, which are in a waveband "A-C" for communication between station A and station C, and station A DL (Type 1), which is dummy light ((a) of FIG. 10). Station A DL (Type 1) has a comb-shaped wavelength arrangement of dummy light with equal wavelength spacing ($\Delta\lambda$).

The terminal station device 4 of station B multiplexes and transmits optical signals of $\lambda(B1)$ and $\lambda(B2)$, which are in a waveband "B-C" for communication between station B and station C, and station B DL, which is dummy light. Station B DL has a flat light spectrum shape and has a wavelength arrangement with a light spectrum width different from that of station A DL (Type 1) ((b) of FIG. 10).

The OADM branching device 2 uses a filter of OADM functionality to pass only the optical signal in the waveband "A-C" assigned to communication between station A and station C out of optical signals from the terminal station device 3 of station A ((c) of FIG. 10). Further, the OADM branching device 2 passes only the optical signal in the waveband "B-C" assigned to communication between station B and station C out of optical signals from station B ((d) of FIG. 10). The OADM branching device 2 multiplexes and transmits the respective optical signals that have passed through the filter. As a result, the terminal station device 45 of station C receives the optical signals in the waveband "A-C" and the waveband "B-C" ((e) of FIG. 10).

The terminal station device 5 of station C measures the light spectrum of the received light using an optical spectrum monitor unit 23, and a monitoring unit 24 analytically detects the presence of a region in which dummy light has a wavelength position whose spacing is different from equal wavelength spacing ($\Delta\lambda$), thereby making it possible to detect the wavelength position of such region. This allows the terminal station device 5 of station C to detect the wavelength at a filter boundary of the OADM branching device 2.

As described above, the third example embodiment enables a filter boundary of an OADM branching device to be identified at a terminal station even when the proportion of a dummy light waveband in a wavelength band of an optical transmission system is greater than the proportion of a waveband of a main optical signal.

Fourth Example Embodiment

A fourth example embodiment is an example in which a terminal station device 3 of station A transmits comb-shaped dummy light with equal wavelength spacing ($\Delta\lambda$) and a terminal station device 4 of station B transmits comb-shaped dummy light with equal wavelength spacing ($\Delta\lambda/2$) and with a light spectrum width that is ½ of that of the dummy light of station A. This is an example of wavelength arrangement where the equal wavelength spacing of comb-shaped dummy light which differ between station A and station B and the light spectrum widths of the comb-shaped dummy light which differ between station A and station B.

Figure 11:
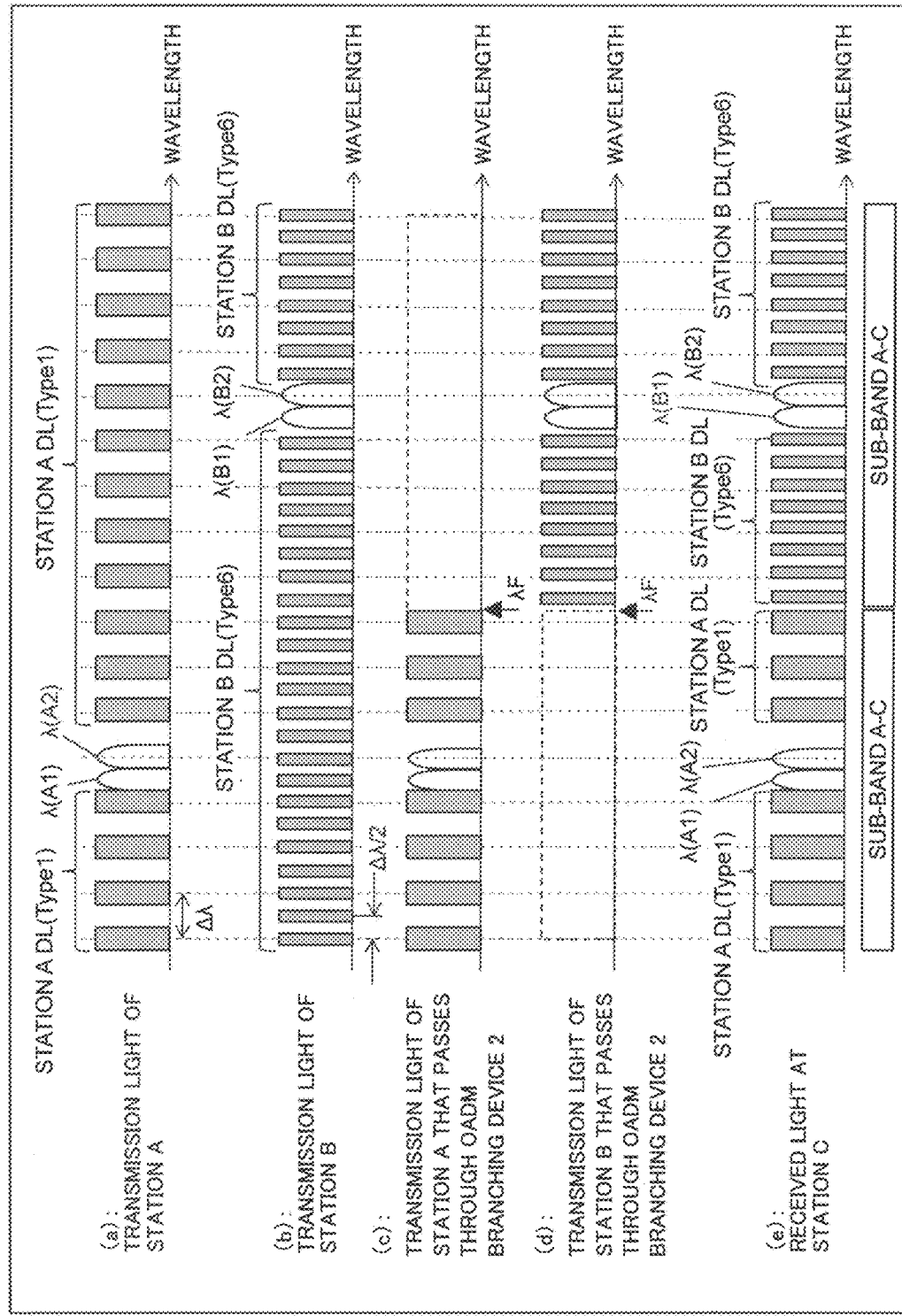
FIG. 11 is a conceptual diagram illustrating states of light spectra in an optical transmission system that uses dummy light having wavelength arrangements that differ from one terminal station to another.

As illustrated in FIG. 11, a terminal station device 3 of station A in an optical transmission system 1 multiplexes and transmits optical signals of $\lambda(A1)$ and $\lambda(A2)$, which are in a waveband "A-C" for communication between station A and station C, and station A DL (Type 1), which is dummy light ((a) of FIG. 11). Station A DL (Type 1) has a wavelength arrangement with equal wavelength spacing ($\Delta\lambda$).

A terminal station device 4 of station B multiplexes and transmits optical signals of $\lambda(B1)$ and $\lambda(B2)$, which are in a waveband "B-C" for communication between station B and station C, and station B DL (Type 6), which is dummy light. Station B DL (Type 6) has a wavelength arrangement with equal wavelength spacing ($\Delta\lambda/2$) and a light spectrum width that is ½ of that of station A DL (Type 1) ((b) of FIG. 11).

An OADM branching device 2 uses a filter of OADM functionality to pass only the optical signal in the waveband "A-C" assigned to communication between station A and station C out of optical signals from the terminal station device 3 of station A ((c) of FIG. 11). Further, the OADM branching device 2 passes only the optical signal in the waveband "B-C" assigned to communication between station B and station C out of optical signals from station B ((d) of FIG. 11). The OADM branching device 2 multiplexes and transmits the optical signals that have passed through the filter. As a result, the terminal station device 45 of station C receives the optical signals in the waveband "A-C" and the waveband "B-C" ((e) of FIG. 11).

The terminal station device 5 of station C measures and analyzes the light spectrum of the received light by using an optical spectrum monitor unit 23 and a monitoring unit 24. Since the wavelength arrangements of dummy light differ between station A and station B, the monitoring unit 24 detects a region in which equal wavelength spacings ($\Delta\lambda$ and $\Delta\lambda/2$) of dummy light are different or a region in which light spectrum widths are different and detects a boundary thereof. This allows the terminal station device 5 of station C to detect the wavelength at a filter boundary of the OADM branching device 2.

As described above, the fourth example embodiment enables a filter boundary of an OADM branching device to be identified at a terminal station even when the proportion of a dummy light waveband in a wavelength band of an optical transmission system is greater than the proportion of a waveband of a main optical signal.

Fifth Example Embodiment

A fifth example embodiment is an example in which dummy light arranged with equal wavelength spacing is applied to the configuration of the optical transmission system of the second example embodiment.

Figure 12:
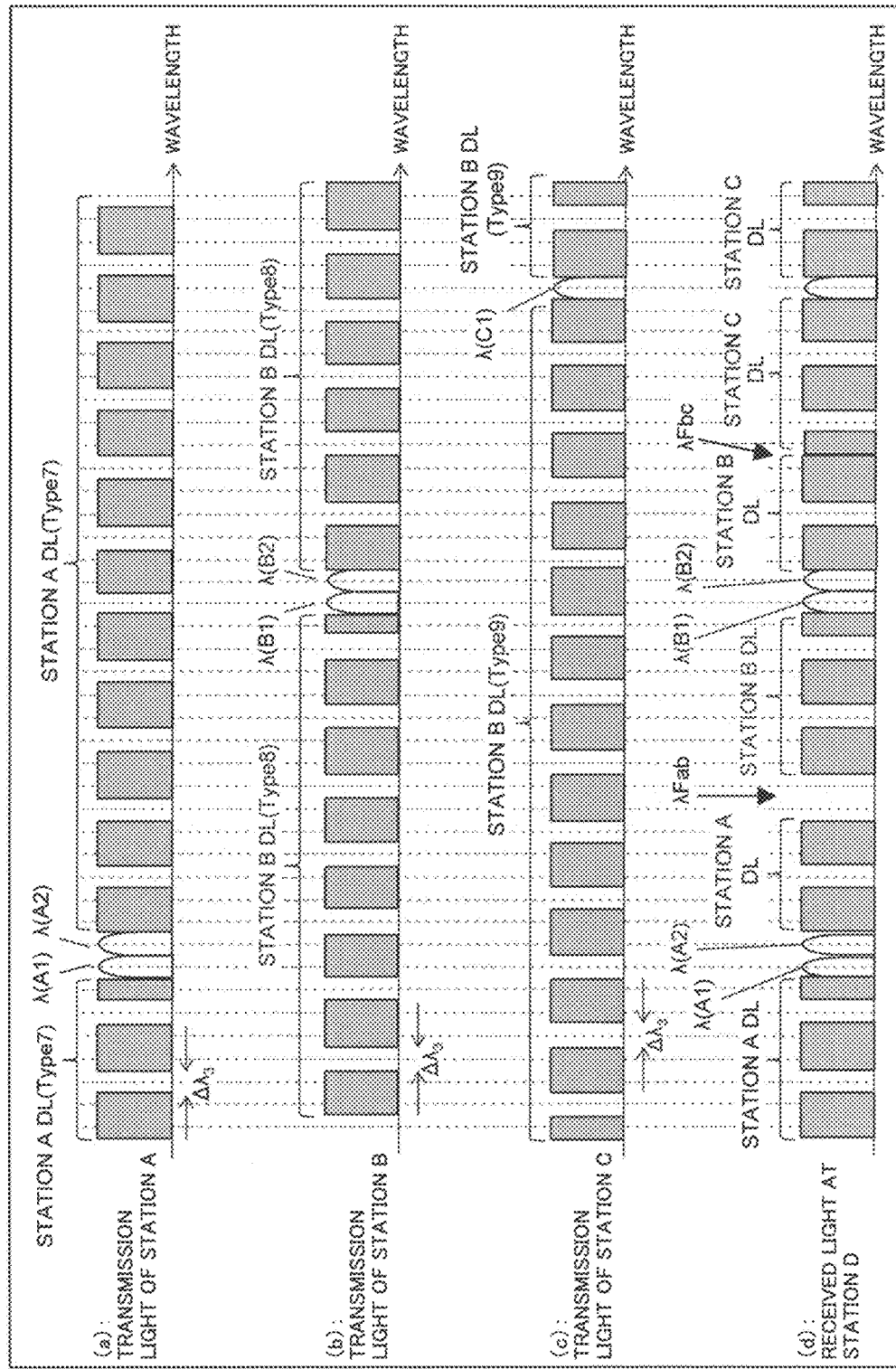
FIG. 12 is a conceptual diagram illustrating states of light spectra in an optical transmission system that uses dummy light having wavelength arrangements that differ from one terminal station to another.

FIG. 12 is a conceptual diagram illustrating states of light spectra in an optical transmission system that uses dummy light having wavelength arrangements that differ from one terminal station to another. The optical transmission system in the fifth example embodiment is an example in which dummy light from each terminal station has a wavelength arrangement with equal wavelength spacing ($\Delta\lambda_3$) and the wavelength arrangements of dummy light of three terminal stations are shifted from one another so that the equal wavelength spacings ($\Delta\lambda_3$) of the dummy light do not overlap one another.

As illustrated in FIG. 12, a terminal station device 43 of station A in an optical transmission system 1 multiplexes and transmits optical signals of $\lambda(A1)$ and $\lambda(A2)$, which are in a waveband "A-D" for communication between station A and station D, and station A DL (Type 7), which is dummy light ((a) of FIG. 12). Station A DL (Type 7) has a wavelength arrangement of dummy light with equal wavelength spacing ($\Delta\lambda_3$).

A terminal station device 44 of station B multiplexes and transmits optical signals of $\lambda(B1)$ and $\lambda(B2)$, which are in a waveband "B-D" for communication between station B and station C, and station B DL (Type 8), which is dummy light. Station B DL (Type 8) has a wavelength arrangement of dummy light with equal wavelength spacing ($\Delta\lambda_3$) ((b) of FIG. 12).

A terminal station device 45 of station C multiplexes and transmits an optical signal of $\lambda(C1)$, which is in a waveband "C-D" for communication between station C and station D, and station C DL (Type 9), which is dummy light. Station C DL (Type 9) has a wavelength arrangement of dummy light with equal wavelength spacing ($\Delta\lambda3$) ((c) of FIG. 12). Further, the wavelength arrangements of station A DL (Type 7), station B DL (Type 8) and station C DL (Type 9) are shifted from one another so that the respective equal wavelength spacings do not overlap one another.

Transmission light from station A, station B and station C is transmitted to station D through the first OADM branching device 41 or the second OADM branching device 42. The terminal station device 46 of station D receives the optical signals including the waveband "A-D", the waveband "B-D" and the waveband "C-D" ((d) of FIG. 12).

The terminal station device 46 of station D measures a light spectrum of the received light by using a light spectrum monitor unit 23. A monitoring unit 24 detects the presence of a region in which dummy light has an equal wavelength spacing ($\Delta\lambda_3$) that is different because of a difference in wavelength arrangement of dummy light from each terminal station and is making it possible to detect the wavelength position of such region.

This allows the terminal station device 46 of station D to detect a wavelength $\lambda F_{ab}$ at a filter boundary of the first OADM branching device 41 and a wavelength $\lambda F_{bc}$ at a filter boundary of the second OADM branching device 42.

As described above, the fifth example embodiment enables a filter boundary of an OADM branching device to be identified at a terminal station even when the proportion of a dummy light waveband in a wavelength band of an optical transmission system is greater than the proportion of a waveband of a main optical signal.

Sixth Example Embodiment

Figure 13:
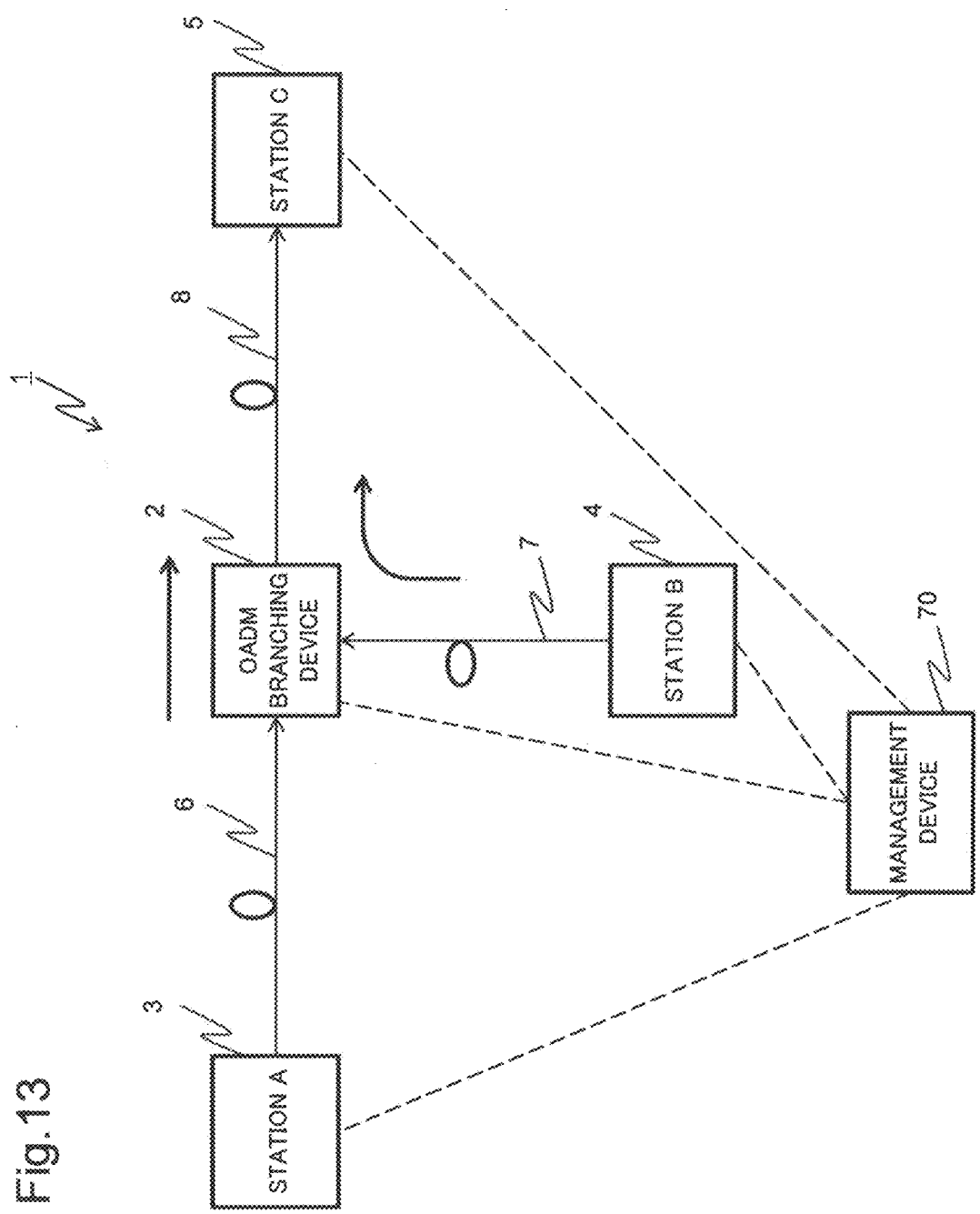
FIG. 13 is a block diagram illustrating a configuration of an optical transmission system including a management device.

A sixth example embodiment has a configuration in which a management device 70 is added to the optical transmission system 1 of the first example embodiment. FIG. 13 is a block diagram illustrating a configuration of an optical transmission system including the management device 70. The management device 70 is coupled to each of terminal station devices 3, 4, and 5 of terminal stations and includes a function of transmitting dummy-light wavelength arrangement information or sub-band wavelength arrangement information on the communication between the terminal stations to the terminal station devices that transmit transmission light. Further, the management device is coupled to an OADM branching device 2 and controls switching of ADD/DROP signals from the OADM branching device 2.

The management device 70 adjusts wavelength arrangements of dummy light generated by the terminal station devices 3, 4 and 5 so that the wavelength arrangements of the dummy light differ between the terminal stations and transmits dummy-light wavelength arrangement information or sub-band wavelength arrangement information to the terminal station devices 3, 4 and 5.

According to the sixth example embodiment, management of operation states of the optical transmission system is facilitated because the management device adjusts the wavelength arrangements of dummy light for each terminal station.

While examples have been described in which the wavelength at a filter boundary of an OAMD branching device is identified at a terminal station device that has received WDM light including dummy light from the OADM branching device in the first to sixth example embodiments, the disclosed subject matter is not limited to these. For example, a management device may include a monitoring unit, may receive information by monitoring a light spectrum of a WMD optical signal including dummy light from a terminal station device that has received the WDM optical signal, and may detect the wavelength at a filter boundary of the OAMD branching device.

Hardware Configuration

Figure 14:
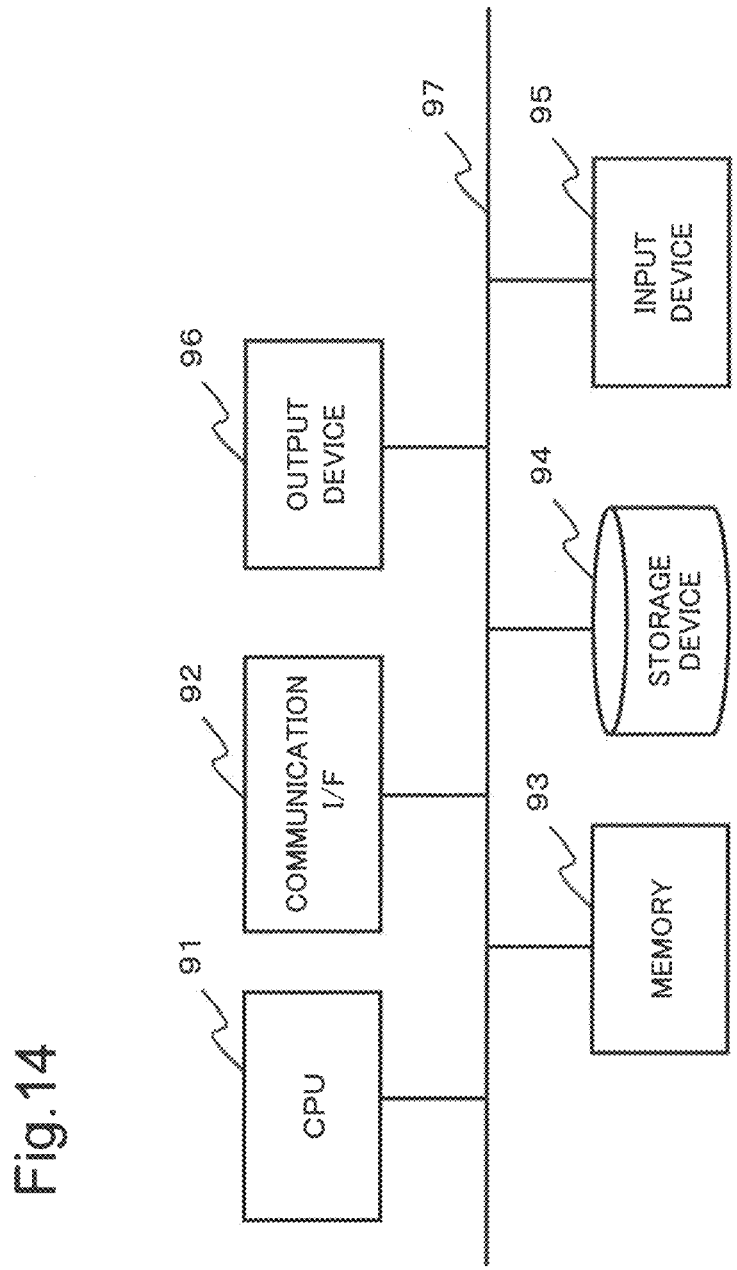
FIG. 14 is a block diagram illustrating a hardware configuration of a management device in an example embodiment of the disclosed subject matter, which is implemented by a computer device.
Figure 15:
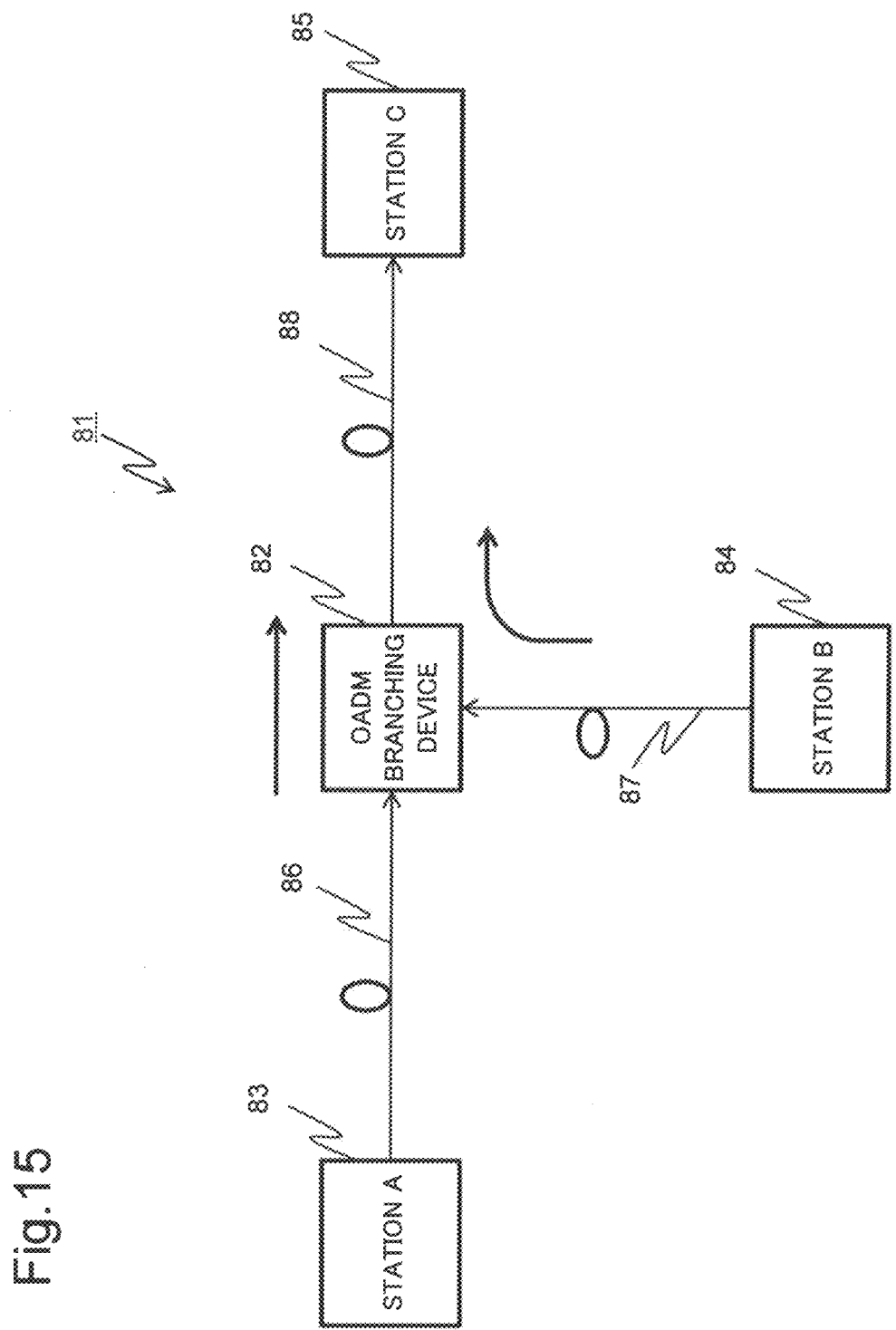
FIG. 15 is a schematic diagram illustrating an optical transmission system including an OADM branching device.

FIG. 14 is a diagram illustrating a hardware configuration of a computer device implementing a management device 70.

As illustrated in FIG. 14, the management device 70 includes a Central Processing Unit (hereinafter called CPU) 91, a communication interface (communication I/F) 92 for network connection, a memory 93, and a storage device 94, such as a hard disk, which stores programs. Further, the management device 70 is connected to an input device 95 and an output device 96 through a system bus 97.

The CPU 91 runs an operating system to control the management device in the example embodiments of the disclosed subject matter. Further, the CPU 91 reads out programs and data from a storage medium loaded in a drive device, for example, into the memory 93. Furthermore, the CPU 91 includes a function of processing input information signals, for example, and executes processing of various functions in accordance with a program.

The storage device 94 is, for example, an optical disc, a flexible disk, a magneto-optical disk, an external hard disk, a semiconductor memory or the like. Some of storage media of the storage device 94 are nonvolatile storage devices, which store programs therein. Further, a program is coupled to a communication network. A program may be downloaded from an external computer, not illustrated.

The input device 95 is implemented by a mouse, a keyboard, built-in key buttons, a card insertion slot, a touch panel or the like, for example, and is used for input operations. The output device 96 is implemented by a display, for example, and is used for outputting and checking information processed by the CPU 91 and the like.

Other Example Embodiments

After an ADD/DROP signal is switched at an OADM branching device, a receiving terminal station side needs to check whether or not the switching has been properly made. In the example embodiments described above, wavelength arrangements of dummy included in transmission light from terminal stations differ from one terminal station to another. Wavelength arrangement information (such as an equal wavelength spacing, a rectangular center wavelength spacing, a light spectrum width or the like) of dummy light of each terminal station may be received from another terminal station or a network management device in advance and the light spectrum of received dummy light may be analyzed to detect which terminal station has transmitted the dummy light. Accordingly, whether the OADM branching device has been properly switched can be checked on a receiving terminal station side.

Furthermore, a Reconfigurable Optical Add-Drop Multiplexer (hereinafter called ROADM) may be used as an OADM branching device in the example embodiments described above.

Further, Optical Signal-to-Noise Ratio (hereinafter called OSNR) monitoring functionality can be provided by shaping dummy light into a waveform similar to that of an optical signal when performing filter shaping of the dummy light and multiplexing the dummy light with the optical signal.

The directions of arrows in figures are illustrative and not intended to limit the directions of signals between blocks.

While the disclosed subject matter has been described with reference to example embodiments (and examples), the disclosed subject matter is not limited to the example embodiments (and the examples) described above. Various modifications that can be understood by those skilled in the art may be made to the configurations and details of the disclosed subject matter within the scope of the disclosed subject matter.

Part or whole of the example embodiments can be described as, but not limited to, the following Supplementary Notes.

Supplementary Note 1

An optical transmission system includes: a terminal station device that transmits a wavelength multiplexed optical signal resulting from multiplexing an optical signal and dummy light; and an optical add-drop multiplexer that receives respective wavelength multiplexed optical signals transmitted from a plurality of the terminal station devices and performs add-drop processing on the wavelength multiplexed optical signals.

The dummy light has a wavelength arrangement in which adjacent wavelengths are arranged with equal spacing, and the wavelength arrangement of the dummy light differs between the terminal station devices.

Supplementary Note 2

In the optical transmission system according to Supplementary Note 1, the wavelength arrangements of the dummy light of the terminal station devices are shifted from one another.

Supplementary Note 3

In the optical transmission system according to Supplementary Note 1, the wavelength arrangements of the dummy light of the terminal station devices do not overlap one another.

Supplementary Note 4

In the optical transmission system according to Supplementary Note 1, the light spectrum width of the dummy light differs between the terminal station devices.

Supplementary Note 5

In the optical transmission system according to Supplementary Note 1, the dummy light of one of a plurality of terminal station devices has a wavelength arrangement with equal wavelength spacing and the dummy light of another of the plurality of terminal station devices has a light spectrum shape being continuous.

Supplementary Note 6

The optical transmission system according to any one of Supplementary Notes 1 to 5, further includes: a receiving terminal station device that receives output light from the optical add-drop multiplexer. The receiving terminal station device includes monitoring means that analyzes a light spectrum of the output light.

Supplementary Note 7

A terminal station device of an optical transmission system includes an optical add-drop multiplexer that receives a wavelength multiplexed optical signal resulting from multiplexing an optical signal and dummy light from each of a plurality of terminal station devices and performs add-drop processing on the wavelength multiplexed optical signal. The dummy light has a wavelength arrangement in which adjacent wavelength spacing is equally spaced and the wavelength arrangement of the dummy light differs between the terminal station devices.

Supplementary Note 8

A receiving terminal station device of an optical transmission system includes an optical add-drop multiplexer that receives a wavelength multiplexed optical signal from each of a plurality of terminal station devices. The receiving terminal station device includes:

a light spectrum monitor means that measures a light spectrum of output light transmitted from the optical add-drop multiplexer; and a monitoring means that detects a filter boundary of the optical add-drop multiplexer in a measured light spectrum, based on a difference in a wavelength arrangement of dummy light between the terminal station devices, the difference being reflected in the light spectrum.

The optical add-drop multiplexer receives a wavelength multiplexed optical signal resulting from multiplexing the dummy light and an optical signal, the dummy light having a wavelength arrangement that differs between the terminal station devices.

Supplementary Note 9

An analyzing method for an optical transmission system includes an optical add-drop multiplexer coupled to terminal station devices.

The analyzing method includes:

performing, by the optical add-drop multiplexer, add/drop processing on a wavelength multiplexed optical signal resulting from multiplexing dummy light and an optical signal, and transmitting a resulting signal, the dummy light having a wavelength arrangement that differs between the terminal station devices; and measuring a light spectrum of output light transmitted from the optical add-drop multiplexer and detecting a filter boundary of the optical add-drop multiplexer in the light spectrum, based on a difference in a wavelength arrangement of the dummy light between the terminal station devices, the difference being reflected in the light spectrum.

Supplementary Note 10

A management device of the optical transmission system according to one aspect of the disclosed subject matter. The management device is coupled to the terminal station devices and transmits wavelength arrangement information in which the wavelength arrangement of the dummy light differs between the terminal station devices, to the terminal station devices.

This application is based upon and claims the benefit of priority from Japanese Patent Application No. 2015-054563 filed on Mar. 18, 2015, the entire disclosure of which is incorporated herein.

REFERENCE SIGNS LIST

1 Optical transmission system
2 OADM branching device
3 Terminal station device
4 Terminal station device
5 Terminal station device
6 Optical transmission path
7 Optical transmission path
8 Optical transmission path
10 Optical transmission device
11 First optical multiplexer
12 Dummy light emission unit
13 Second optical multiplexer
20 Optical receiving device
21 First optical demultiplexer
22 Second optical demultiplexer
23 Light spectrum monitor unit
24 Monitoring unit
40 Optical transmission system
41 OADM branching device
42 OADM branching device
43 Terminal station device
44 Terminal station device
45 Terminal station device
46 Terminal station device
47 Optical transmission path
48 Optical transmission path
49 Optical transmission path
50 Optical transmission path
51 Optical transmission path
70 Management device
91 CPU
92 Communication I/F (communication interface)
93 Memory
94 Storage device
95 Input device
96 Output device
97 System bus

The invention claimed is:

1. An optical transmission system comprising:
a terminal station device that transmits a wavelength multiplexed optical signal resulting from multiplexing an optical signal and dummy light; and
an optical add-drop multiplexer that receives respective wavelength multiplexed optical signals transmitted from a plurality of the terminal station devices and performs add-drop processing on the wavelength multiplexed optical signals,
wherein the dummy light has a wavelength arrangement in which adjacent wavelengths of the dummy light are arranged with equal spacing, and the wavelength arrangement of the dummy light differs between the terminal station devices, and wherein a light spectrum width of the dummy light differs between the terminal station devices.

2. The optical transmission system according to claim 1, wherein wavelength arrangements of the dummy light between the terminal station devices are shifted from one another.

3. The optical transmission system according to claim 1, wherein wavelength arrangements of the dummy light between the terminal station devices do not overlap one another.

4. The optical transmission system according to claim 1, wherein the dummy light of one of a plurality of terminal station devices has a wavelength arrangement with equal wavelength spacing and the dummy light of another of the plurality of terminal station devices has a light spectrum shape being continuous.

5. The optical transmission system according to claim 1, further comprising:
   a receiving terminal station device that receives output light from the optical add-drop multiplexer,
   wherein the receiving terminal station device includes a filter boundary monitor that analyzes a light spectrum of the output light.

6. A terminal station device of an optical transmission system including an optical add-drop multiplexer that receives a wavelength multiplexed optical signal resulting from multiplexing an optical signal and dummy light from each of a plurality of terminal station devices and performs add-drop processing on the wavelength multiplexed optical signal, the terminal station device comprising:
   at least one optical transmitter that transmits the optical signal; and
   a dummy light emitter that emits dummy light,
   wherein the dummy light has a wavelength arrangement in which adjacent wavelength spacing of the dummy light is equally spaced and the wavelength arrangement of the dummy light differs between the terminal station devices, and
   wherein a light spectrum width of the dummy light differs between the terminal station devices.

7. A receiving terminal station device of an optical transmission system including an optical add-drop multiplexer that receives a wavelength multiplexed optical signal from each of a plurality of terminal station devices, the receiving terminal station device comprising:
   a light spectrum monitor that measures a light spectrum of output light transmitted from the optical add-drop multiplexer; and
   a filter boundary monitor that detects a filter boundary of the optical add-drop multiplexer in a measured light spectrum, based on a difference in a wavelength arrangement of the dummy light between the terminal station devices, the difference being reflected in the light spectrum,
   wherein the optical add-drop multiplexer receives a wavelength multiplexed optical signal resulting from multiplexing dummy light and an optical signal, the dummy light having a wavelength arrangement that differs between the terminal station devices.

8. An analyzing method for an optical transmission system including an optical add-drop multiplexer coupled to terminal station devices, the analyzing method comprising:
   performing, by the optical add-drop multiplexer, add/drop processing on a wavelength multiplexed optical signal resulting from multiplexing dummy light and an optical signal, and transmitting a resulting signal, the dummy light having a wavelength arrangement that differs between the terminal station devices; and
   measuring a light spectrum of output light transmitted from the optical add-drop multiplexer and detecting a filter boundary of the optical add-drop multiplexer in the light spectrum, based on a difference in a wavelength arrangement of the dummy light between the terminal station devices, the difference being reflected in the light spectrum.

9. An optical transmission system comprising:
   a terminal station device that transmits a wavelength multiplexed optical signal resulting from multiplexing an optical signal and dummy light; and
   an optical add-drop multiplexer that receives respective wavelength multiplexed optical signals transmitted from a plurality of the terminal station devices and performs add-drop processing on the wavelength multiplexed optical signals,
   wherein the dummy light has a wavelength arrangement in which adjacent wavelengths of the dummy light are arranged with equal spacing, and the wavelength arrangement of the dummy light differs between the terminal station devices, and
   wherein the management device is coupled to the terminal station devices and transmits wavelength arrangement information in which the wavelength arrangement of the dummy light differs between the terminal station devices, to the terminal station devices.

* * * * *